United States Patent
Herzog et al.

(10) Patent No.: US 11,179,806 B2
(45) Date of Patent: Nov. 23, 2021

(54) DEVICE FOR THE ADDITIVE PRODUCTION OF THREE-DIMENSIONAL COMPONENTS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Tobias Bokkes, Untersiemau (DE); Fabian Zeulner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 706 days.

(21) Appl. No.: 15/540,009

(22) PCT Filed: Jan. 12, 2016

(86) PCT No.: PCT/EP2016/050470
§ 371 (c)(1),
(2) Date: Jun. 26, 2017

(87) PCT Pub. No.: WO2016/113253
PCT Pub. Date: Jul. 21, 2016

(65) Prior Publication Data
US 2017/0368640 A1 Dec. 28, 2017

(30) Foreign Application Priority Data

Jan. 14, 2015 (DE) .......................... 102015000102.7

(51) Int. Cl.
*B33Y 30/00* (2015.01)
*B33Y 50/02* (2015.01)
(Continued)

(52) U.S. Cl.
CPC ............ *B23K 26/342* (2015.10); *B22F 10/20* (2021.01); *B23K 26/034* (2013.01);
(Continued)

(58) Field of Classification Search
CPC ...... B33Y 30/00; B33Y 50/02; B23K 26/034; B23K 26/082; B23K 26/342;
(Continued)

(56) References Cited

U.S. PATENT DOCUMENTS 6,126,884 A * 10/2000 Kerekes ................. B33Y 10/00
264/401
6,129,884 A * 10/2000 Beers ..................... B33Y 30/00
264/401
(Continued)

FOREIGN PATENT DOCUMENTS

DE 202010010771 U1 11/2011
DE 102013201629 A1 7/2014
(Continued)

*Primary Examiner* — Seyed Masoud Malekzadeh
(74) *Attorney, Agent, or Firm* — Dority & Manning, P.A.

(57) ABSTRACT

Device for production of three-dimensional components, namely a laser melting device or laser sintering device, in which a component is produced by successive solidifying of individual layers made from solidifiable construction material, by radiation, through melting of the construction material, wherein the dimensions and/or temperature of the melt area generated by a point-shaped or line-shaped energy input can be captured by a sensor device of a process monitoring system, and sensor values for evaluation of a component quality can by deduced therefrom, wherein the radiation created by the melt area and used for the generation of the sensor values passes through the scanner used for the melt energy input, and guided to the sensor device of the process monitoring system, wherein an optical focus tracking device is arranged in the radiation path used for generation of the sensor values between the scanner and the sensor device.

19 Claims, 1 Drawing Sheet

(51) Int. Cl.
| | |
|---|---|
| *B29C 64/153* | (2017.01) |
| *B22F 10/20* | (2021.01) |
| *B29C 64/393* | (2017.01) |
| *B22F 12/49* | (2021.01) |
| *B22F 12/90* | (2021.01) |
| *B22F 10/28* | (2021.01) |
| *B22F 10/366* | (2021.01) |
| *B22F 10/80* | (2021.01) |
| *B22F 10/85* | (2021.01) |
| *B22F 12/41* | (2021.01) |
| *B23K 26/342* | (2014.01) |
| *B23K 26/046* | (2014.01) |
| *B23K 26/082* | (2014.01) |
| *B23K 26/03* | (2006.01) |
| *B28B 1/00* | (2006.01) |
| *B28B 17/00* | (2006.01) |
| *B22F 10/30* | (2021.01) |
| *B22F 10/368* | (2021.01) |

(52) U.S. Cl.
CPC .......... *B23K 26/046* (2013.01); *B23K 26/082* (2015.10); *B28B 1/001* (2013.01); *B28B 17/0081* (2013.01); *B29C 64/153* (2017.08); *B29C 64/393* (2017.08); *B33Y 30/00* (2014.12); *B33Y 50/02* (2014.12); *B22F 10/28* (2021.01); *B22F 10/30* (2021.01); *B22F 10/366* (2021.01); *B22F 10/368* (2021.01); *B22F 10/80* (2021.01); *B22F 10/85* (2021.01); *B22F 12/41* (2021.01); *B22F 12/49* (2021.01); *B22F 12/90* (2021.01); *B22F 2999/00* (2013.01); *Y02P 10/25* (2015.11)

(58) Field of Classification Search
CPC ... B23K 26/046; B28B 1/001; B28B 17/0081; B29C 64/393; B29C 64/386; B29C 64/153; B22F 2003/1057; B22F 2999/00; B22F 3/1055; B22F 2203/11; B22F 10/20; B22F 10/28; B22F 10/30; B22F 10/36; B22F 10/366; B22F 10/368; B22F 10/80; B22F 10/85; B22F 12/222; B22F 12/40; B22F 12/41; B22F 12/90
See application file for complete search history.

(56) References Cited

U.S. PATENT DOCUMENTS

| | | | | |
|---|---|---|---|---|
| 6,132,667 | A * | 10/2000 | Beers | G03F 7/0037 264/401 |
| 6,241,934 | B1 * | 6/2001 | Everett | G05B 19/4099 264/401 |
| 6,325,961 | B1 * | 12/2001 | Beers | B29C 64/40 264/401 |
| 6,600,129 | B2 | 7/2003 | Shen et al. | |
| 9,061,465 | B2 * | 6/2015 | Hagiwara | B29C 67/0077 |
| 10,265,912 | B2 * | 4/2019 | Herzog | B29C 64/153 |
| 2005/0045090 | A1 * | 3/2005 | Ikegami | B23K 26/0732 117/8 |
| 2009/0206065 | A1 * | 8/2009 | Kruth | B23K 26/342 219/121.66 |
| 2010/0134628 | A1 * | 6/2010 | Pfitzner | B23K 26/03 348/159 |
| 2013/0168902 | A1 * | 7/2013 | Herzog | B22F 3/1055 264/401 |
| 2014/0035205 | A1 * | 2/2014 | Hagiwara | B29C 67/0077 264/497 |
| 2015/0048064 | A1 * | 2/2015 | Cheverton | B23K 26/342 219/121.63 |
| 2016/0016255 | A1 * | 1/2016 | Bruck | B33Y 40/00 219/76.14 |
| 2016/0114431 | A1 * | 4/2016 | Cheverton | B23K 26/032 219/76.1 |

FOREIGN PATENT DOCUMENTS

| | | |
|---|---|---|
| JP | 2009291811 A | 12/2009 |
| JP | 2014028996 A | 2/2014 |
| WO | 2007147221 A1 | 12/2007 |

* cited by examiner

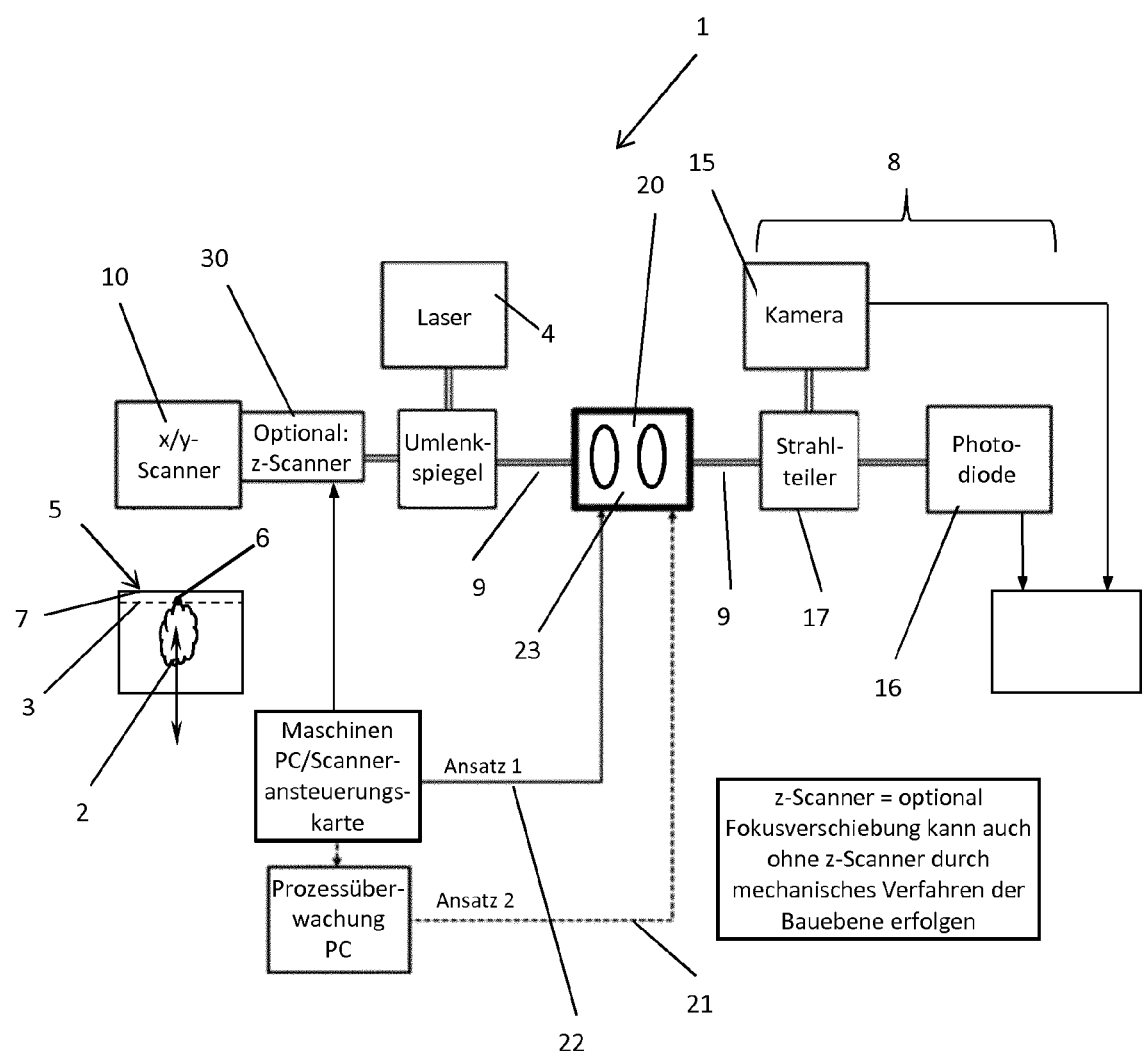

DEVICE FOR THE ADDITIVE PRODUCTION OF THREE-DIMENSIONAL COMPONENTS

CROSS-REFERENCE TO RELATED APPLICATIONS

This application is a United States national stage entry of an International Application serial no. PCT/EP2016/050470 filed Jan. 12, 2016 which claims priority to German Patent Application serial no. 10 2015 000 102.7 filed Jan. 14, 2015. The contents of these applications are incorporated herein by reference in their entirety as if set forth verbatim.

DESCRIPTION

The invention relates to a device for the additive production of three-dimensional components, namely a laser sintering device or a laser melting device, with the further features of patent claim 1.

In such devices, a component is produced by successive solidification of individual layers of construction material, especially powder material, as the result of the impact of a radiation by melting on the construction material. The melting section created by a point-type or linear energy input is detected regarding its dimension, shape or temperature using a sensor device. Therefrom sensor values for evaluating a component quality are derived. The radiation created by the melting section and used for the generation of the sensor values penetrates the scanner employed for the melting energy input. Such a device is e.g. known from DE 20 2010 010 771 U1.

Alternatively, a change of focus of the melting beam can also be carried out by a change of the distance between construction plane and scanner optics, namely by lowering and lifting the construction platform.

The invention is based on the object of designing a device with the features of the preamble of claim 1 such that, in case of a variation of the laser focus and thus the laser spot size variation, an optimized performance of process monitoring can be ensured. This object is solved by the characterizing features of claim 1, advantageous further developments result from the dependent claims.

The device according to the invention first comprises a device enabling a focus displacement and thus also a spot size variation. On the one hand, this can take place by so-called 3D scanning optics, with which a focus adjustment, i.e. a spot size change of the laser spot size, on the surface to be molten is possible in the process.

Furthermore, it is provided to arrange an optical focus tracking device between the scanner of the device and the sensor device of the process monitoring system, which can be actuated by electronic machine data used in the device during the process to track focus.

With that measure, an automatic adjustment of the "field of view" of the process monitoring system to the conditions actually present in the process on the powder surface in the section of the melting spot is carried out. When the spot size of the melting beam increases, then the angle of vision of the process monitoring system is enlarged by the process data used such that an increased melting spot can be detected by the process monitoring system fully, i.e. also in the edge regions thereof, so that accurate data for the process monitoring are available. The same applies in case of a reduction in the melting spot, then the optical focus tracking device controlled by electronic machine data will provide that the reduced melting pool can be accurately examined, which also results in a definite improvement in the process monitoring result.

A manual tracking for example by manual adjustment of objective lens systems of the process monitoring system can be omitted; the process monitoring procedure is automatically adjusted to that focus, by which the powder is molten on.

The machine data used to track focus of the process monitoring system can e.g. be scanner actuation data of the PC scanner actuation card of the device, which controls the focus of the scanner lens in the presence of a so-called 3D scanner. However, the machine data can also be data derived from or comprising construction process parameters.

The focus tracking optics have at least one optical focusing element, for example a focusing lens, that can be moved by a motor, but the focusing element can also be formed as a lens set that can be moved by a motor.

In order to in each case guarantee an improvement to the process monitoring, it can be of particular advantage, when the focus tracking optics of the process monitoring system are performed prior to the focus adjustment of the melting beam directed to the layer of powder. This means that the scanner data at first perform a focus adjustment of the process monitoring system, and the focus adjustment for the melting beam, also controlled by the machine data, follows the focus adjustment of the process monitoring system. This can take place by a simple delay circuit or delaying control that e.g. carries out a focus adjustment of the melting beam only when the process monitoring system is already set to the new focus.

The sensor device can comprise a plurality of photosensitive elements that can selectively or also collectively be brought into the beam or a partial beam of the process monitoring system. This can be done by deflection mirrors, beam splitters or the like. When beam splitters are used, it is possible to operate several or all photosensitive elements of the sensor device in parallel and optionally to take parallel measurements in different spectral regions that can be introduced into the process monitoring. Possible sensor regions are a wavelength range of e.g. 780-950 nm, another wavelength range possibly of interest can be chosen at around 1,200 nm.

In each case, it needs to be ensured that a melting beam focus adjustment in the area of process monitoring is compensated by the focus tracking device.

BRIEF DESCRIPTION OF FIGURES

The invention is explained in more detail by means of an exemplary embodiment in the FIGURE of the drawing. In which:

FIG. 1 shows A schematic diagram of the significant components of a device for the additive production of three-dimensional components in a form of a laser melting device comprising a process monitoring system with optical focus tracking is shown.

DETAILED DESCRIPTION

The device 1 shown in FIG. 1 of the drawings is for the additive production of three-dimensional components 2 produced by successive solidification of individual layers 3 of construction material that can be solidified as the result of the impact of a radiation 4 by melting on the construction material 5. The melting section 6 in the construction plane 7 created by a point-type or linear energy input is detected using a sensor device 8 of a process monitoring system regarding its dimension shape and/or regarding its temperature. Therefore sensor values for evaluating a component quality are derived, wherein the radiation 9 created by the melting section 6 and used for the generation of the sensor values penetrates the scanner 10 employed for the melting energy input in reverse direction, and is directed to the sensor device 8 of the process monitoring system by said scanner. Process monitoring systems, in which the reflected radiation created by the melting section is directed to a sensor device by the scanner in reverse direction, are referred to as so-called coaxial process monitoring systems, because the radiation emanating the laser for energy input and the reflected radiation for the process monitoring system penetrate the scanner coaxially.

The sensor device 8 can comprise a camera 15, a photodiode 16 or also several photosensitive elements, wherein it can be provided that the radiation 9 used for the generation of sensor values penetrates a beam splitter 17, which distributes the radiation e.g. to the camera, the photodiode or further photosensitive elements.

According to the invention, an optical focus tracking device 20 is arranged between the scanner 10 and the sensor device 8 of the process monitoring system, which can be readjusted by electronic machine data 21, 22 to track focus.

The focus tracking device comprises at least one optical focusing element that can be adjusted by a motor, e.g. a lens set 23 that can be moved by a motor, which serves the purpose of performing a refocusing of the radiation 9 used for the generation of the sensor values.

Refocusing is performed, when either the optical path of the device comprising at least the radiation source and the scanner is provided with an optical adjustment device 30 for melting beam focus adjustment, or a focus adjustment of the melting beam is carried out by mechanically moving the construction plane 7.

The machine data can on the one hand be or comprise scanner actuation data from a scanner actuation card, wherein such scanner actuation data primarily affect a 3D scanner regarding the z-axis focusing.

The machine data can, however, also be or comprise data derived from construction process parameters, especially data used for height adjustment of the construction plane, because a height adjustment of the construction plane also results in defocusing the melting beam.

The machine data delivered to the focus tracking device 20 can be controlled regarding time such that a focus tracking of the radiation 9 used for the generation of the sensor values using the focus tracking device 20 results into a z-axis adjustment of a 3D scanner 10 or a height adjustment of the construction plane. This ensures that upon application of the laser radiation and thus generation of the melting pool, which is to be monitored, the beam 9 used for the generation of the sensor values is already optimized regarding its focus.

In order to be able to evaluate the data from the sensor device 8, i.e. the camera data from the camera 15 and the sensor data from the photodiode 16, a processor unit is provided, in which the data can be processed, stored and be brought into a format that enables visualization of the 3D data for example for reverse engineering.

LIST OF REFERENCE NUMBERS

1. Device
2. Component
3. Layer
4. Radiation
5. Construction material
6. Melting section
7. Construction plane
8. Sensor device
9. Radiation
10. Scanner
15. Camera
16. Photodiode
17. Beam splitter
20. Focus tracking device
21. Machine data
22. Machine data
23. Lens set

The invention claimed is:

1. A device for additively manufacturing three-dimensional objects, the device comprising:
   a laser melting device configured to provide a melting beam comprising radiation configured to melt and thereby successively solidify individual layers of construction material respectively defining a construction plane, the radiation from the melting beam generating a melting section in the construction plane;
   a scanner comprising an optical adjustment device configured to direct the melting beam upon the construction plane;
   a process monitoring system comprising a sensor device configured to generate sensor values from reflected radiation detected from the melting section, the sensor values being indicative of a size, shape, and/or temperature corresponding to the melting section; and
   an optical focus tracking device comprising at least one focusing lens actuatable by electronic machine data derived at least in part from the sensor values to impart a first focus adjustment to reflected radiation detected by the process monitoring system followed by a second focus adjustment to the melting beam emitted by the laser melting device;
   wherein the at least one focusing lens is arranged between the scanner and the sensor device.

2. The device of claim 1, wherein the second focus adjustment is carried out at least in part by mechanically adjusting the construction plane.

3. The device of claim 1, wherein the second focus adjustment is carried out at least in part by the optical adjustment device.

4. The device of claim 1, wherein the process monitoring system comprises a delay circuit or a delaying control configured to perform the second focus adjustment after the first focus adjustment.

5. The device of claim 1, wherein the at least one focusing lens comprises a lens set that can be moved by a motor.

6. The device of claim 1, wherein the sensor device comprises a plurality of photosensitive elements.

7. The device of claim 1, wherein at least a portion of the sensor device is configured for a wavelength range of from 780 nm to 950 nm.

8. The device of claim 1, wherein at least a portion of the sensor device is configured for a wavelength range of around 1,200 nm.

9. The device of claim 1, wherein the sensor device comprises a camera, a photodiode, and a beam splitter configured to direct a first portion of the reflected radiation to the camera and a second portion of the reflected radiation to the photodiode.

10. A method of additively manufacturing a three-dimensional component, the method comprising:

emitting a melting beam comprising radiation from a laser melting device, the melting beam configured to melt and thereby successively solidify sequential layers of construction material respectively defining a construction plane, the melting beam generating a melting section in the construction plane;

directing the melting beam upon the construction plane using a scanner comprising an optical adjustment device;

detecting reflected radiation from the melting section with a process monitoring system comprising a sensor device configured to generate sensor values indicative of a size, shape, and/or temperature corresponding to the melting section;

imparting a first focus adjustment to reflected radiation detected by the process monitoring system using an optical focus tracking device comprising at least one focusing lens actuatable by electronic machine data derived at least in part from the sensor values, wherein the at least one focusing lens is arranged between the scanner and the sensor device; and imparting a second focus adjustment to the melting beam emitted by the laser melting device after the first focus adjustment.

11. The method of claim 10, wherein the imparting the second focus adjustment comprises mechanically adjusting the construction plane.

12. The method of claim 10, wherein the imparting the second focus adjustment comprises moving the optical adjustment device.

13. The method of claim 10, wherein the process monitoring system comprises a delay circuit or a delaying control configured to perform the second focus adjustment after the first focus adjustment.

14. The method of claim 10, wherein imparting a first focus adjustment comprises moving the at least one focusing lens using a motor.

15. The method of claim 10, wherein the sensor device comprises a plurality of photosensitive elements.

16. The method of claim 10, wherein at least a portion of the sensor device is configured for a wavelength range of from 780 nm to 950 nm.

17. The method of claim 10, wherein at least a portion of the sensor device is configured for a wavelength range of around 1,200 nm.

18. The method of claim 10, wherein the sensor device comprises a camera, a photodiode, and a beam splitter configured to direct a first portion of the reflected radiation to the camera and a second portion of the reflected radiation to the photodiode.

19. A computer readable medium comprising computer-executable instructions, which when executed by a processor associated with an additive manufacturing device, cause the additive manufacturing device to perform a method of additively manufacturing a three-dimensional component, the method comprising:

emitting a melting beam comprising radiation from a laser melting device, the melting beam configured to melt and thereby successively solidify sequential layers of construction material respectively defining a construction plane, the melting beam generating a melting section in the construction plane;

directing the melting beam upon the construction plane using a scanner comprising an optical adjustment device;

detecting reflected radiation from the melting section with a process monitoring system comprising a sensor device configured to generate sensor values indicative of a size, shape, and/or temperature corresponding to the melting section;

imparting a first focus adjustment to reflected radiation detected by the process monitoring system using an optical focus tracking device comprising at least one focusing lens actuatable by electronic machine data derived at least in part from the sensor values, wherein the at least one focusing lens is arranged between the scanner and the sensor device; and imparting a second focus adjustment to the melting beam emitted by the laser melting device after the first focus adjustment.

\* \* \* \* \*